United States Patent [19]

Ishihara et al.

[11] Patent Number: 5,418,890
[45] Date of Patent: May 23, 1995

[54] ARM ORIGIN CALIBRATING METHOD FOR AN ARTICULATED ROBOT

[75] Inventors: Katsumi Ishihara; Takeo Tanita, both of Yokohama; Yasuhiro Sawada, Chofu, all of Japan

[73] Assignee: Canon Kabushiki Kaisha, Tokyo, Japan

[21] Appl. No.: 898,549

[22] Filed: Jun. 15, 1992

[30] Foreign Application Priority Data

Jun. 25, 1991 [JP] Japan ................... 3-153008

[51] Int. Cl.6 ............................. G05B 19/42
[52] U.S. Cl. ......................... 395/89; 395/83
[58] Field of Search ............ 395/83, 85, 86, 89, 395/99

[56] References Cited

U.S. PATENT DOCUMENTS

| | | | |
|---|---|---|---|
| 4,481,592 | 11/1984 | Jacobs et al. | 395/89 |
| 4,706,004 | 11/1987 | Komatsu et al. | 395/901 |
| 4,757,458 | 7/1988 | Takemoto et al. | 395/89 |
| 5,162,713 | 11/1992 | Mohri et al. | 395/99 |
| 5,239,855 | 8/1993 | Schleifer et al. | 73/1 D |

FOREIGN PATENT DOCUMENTS

| | | |
|---|---|---|
| 63-101907 | 5/1988 | Japan . |
| 1143377 | 2/1989 | Japan . |
| 1193190 | 8/1989 | Japan . |

*Primary Examiner*—Allen R. MacDonald
*Assistant Examiner*—Stuart B. Shapiro
*Attorney, Agent, or Firm*—Fitzpatrick, Cella, Harper & Scinto

[57] ABSTRACT

An arm origin calibrating method for an articulated robot is capable of implementing highly accurate calibration without requiring special high-precision measuring devices. A round bar is mounted on a first arm and a round hole is provided in a second arm. A rotation angle of the second arm is detected when, with the first arm being fixed, the second arm is rotated in the first direction until the round bar comes in contact with the inner surface of the round hole. A rotation angle of the second arm is detected when, with the first arm being fixed, the second arm is rotated in the second direction reverse to the first direction until the round bar comes in contact with the inner surface of the round hole. An offset angle of the second arm is detected on the basis of the two detected rotation angles.

5 Claims, 13 Drawing Sheets

ARM ORIGIN CALIBRATING METHOD FOR AN ARTICULATED ROBOT

BACKGROUND OF THE INVENTION

1. Field of the Invention

The present invention relates to an origin calibrating method for articulated robot arms, particularly, a method for calibrating an angle deviation for arms in zero position thereof.

2. Related Background Art

Japanese Patent Application Laid-Open Nos. 63-101907 and 1-193190 and Japanese Utility Model Application Laid-Open No. 1-143377 are known as examples in the prior art of a method for calibrating an arm origin for articulated robots requiring absolute accuracy.

According to Japanese Patent Application Laid-Open No. 63-101907, arms to be calibrated are positioned at three known points, and data obtained thereby is operated on for obtaining an angle deviation for robot arms.

According to Japanese Patent Application Laid-Open No. 1-193190, a certain point is taught to a robot by means of a right-hand system and a left-hand system for positioning at the point, and the internal data of a robot thereat is operated on for obtaining an angle deviation for arms.

On the other hand, Japanese Utility Model Application Laid-Open No. 1-143377 proposes a mechanical calibrating method for an arm origin. In other words, mounted on the arm side are a jig main body for origin calibration, a center shaft, a zero master, and distance detectors for the jig main body. An arm position is adjusted such that there is no difference in output between two distance detectors with respect to the position of the center shaft.

However, according to the examples of the prior art, particularly, the methods proposed by Japanese Patent Application Laid-Open Nos. 63-101907 and 1-193190, since a robot is positioned in a predetermined position for calibration, a pin of a predetermined shape mounted at an arm tip is inserted into a predetermined engaging hole. As a result, involved is a problem that this positioning work takes time. Moreover, since a positioning accuracy is determined by this engagement, an allowance for this engagement needs to be made smaller, causing the positioning work to become more difficult.

Also, according to the method using a calibrating jig as proposed by Japanese Utility Model 25, Application Laid-Open No. 1-143377, a high-precision jig, a shaft, a zero master, etc. are needed, and moreover, a plurality of engaging holes of good accuracy are needed for accurately fixing such devices on arms, causing an increase in robot cost.

SUMMARY OF THE INVENTION

The present invention proposes an arm origin calibrating method for an articulated robot, thereby implementing a highly accurate calibration for origin without using special high-precision measuring instruments.

According to a construction of the present invention to achieve the above object, an origin calibrating method calibrates an articulated robot having a plurality of arms to align the plurality of arms in a straight line. The plurality of arms comprises a pair of first and second arms connected freely rotatable with each other, said first arm being pivoted at one end thereof in a position closer to a mounting axis of a robot case, and said second arm being pivoted freely rotatable at another end of said first arm. The method comprises the steps of engaging loosely a slender jig provided on one of said two arms and extending in the direction of an axis of rotation of said arm with a hole provided in another arm, inner surface thereof extending in the direction of an axis of rotation of said arm; detecting a first rotation angle of said second arm in a state that said first arm is fixed in position and said second arm is rotated in a first rotating direction to bring said jig into contact with the inner surface of said hole; detecting a second rotation angle of said second arm is a state that said first arm is fixed in position and said second arm is rotated in a second rotating direction reverse to said first rotating direction to bring said jig into contact with the inner surface of said hole; and calculating an offset angle of said second arm with said first arm on the basis of the detected first and second rotation angles.

Since it is assumed that the jig and hole described above engage loosely with each other, machining accuracy thereof is not required to be high. Also, even though a jig and a hole of a high accuracy are not provided, the calculation of an offset angle on the basis of said first and second rotation angles compensates for the roughness of accuracy.

DETAILED DESCRIPTION OF THE PREFERRED EMBODIMENTS

Preferred embodiments of the present invention will hereinafter be described with reference to the drawings.

Articulated robots of the embodiments comprises the n'th arm and the (n+1)'th arm which with the n'th arm being fixed, rotates in the plane of rotation of the (n+1)'th motor fixed on the n'th arm as the motor rotates, and are so constructed that the rotation of the motor is detected by a pulse encoder. The (n+1)'th arm of the articulated robot has a hole with which a round bar (jig shaft) is detachably able to engage closely, the hole being located on the arm's straight line. The n'th arm has a hole with which the jig shaft is able to loosely engage, the hole being located on the arm's straight line.

The articulate robots are so constructed that an angle deviation of the (n+1)'th arm is calculated in the following sequence:

(1) On receiving an origin calibrating signal, a zero return is performed on a motor for setting an encoder pulse detected value to zero, the (n+1)'th arm is rotated to a position where a jig shaft can loosely engage with the n'th arm, and then the jig shaft is inserted into the (n+1)'th arm.

(2) The (n+1)'th arm is pressed with a predetermined force so that the (n+1)'th pulse encoder detected value becomes a positive value, and the number of position detecting pulses at that point of time is stored.

(3) The (n+1)'th arm is pressed with a predetermined force so that the (n+1)'th pulse encoder detected value becomes a negative value, and the number of position detecting pulses at that point of time is stored.

(4) An angle of an extended line of the (n+1)'th arm with the (n+1)'th arm is calculated from the above-mentioned two kinds of the number of position detecting pulses and is stored as an angle deviation of the (n+1)'th arm.

Hence, upon obtaining an angle deviation of the (n+1)'th arm, it does not need to perform many processes of high-accuracy drilling; the calculation itself is simple and free of a calculation error; no engagement error arises when detecting position detecting pulses for deriving an angle deviation; and consequently, an accurate angle deviation of an arm can be obtained.

Figure 1:
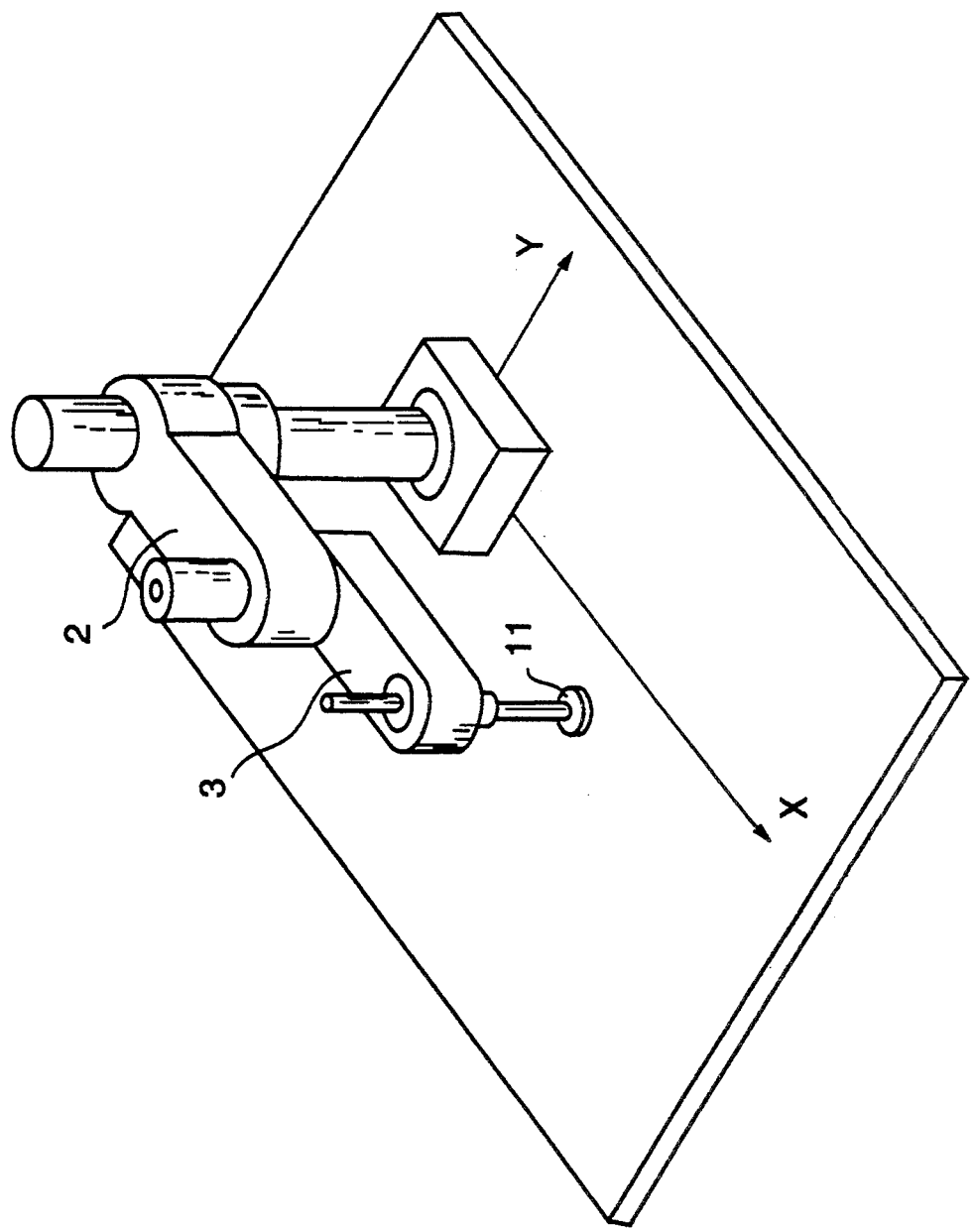
FIG. 1 is a perspective view of an articulated robot to which a calibrating method of the present invention is applied.

FIG. 1 shows an example of an articulated robot (3 axes) to which the present invention is applied, i.e., a horizontally articulated robot.

When a rotation angle is stored for making a rotation to the angular position, i.e., conducting only PTP operation (point-to-point movement) for a robot shown in FIG. 1, no problem arises with respect to calibration. First, described is the reason why "distortion" arises in moving position when a robot as shown in FIG. 1 needs to conduct coordinate transformation, particularly, from an articulated system to cartesian coordinates.

Figure 2:
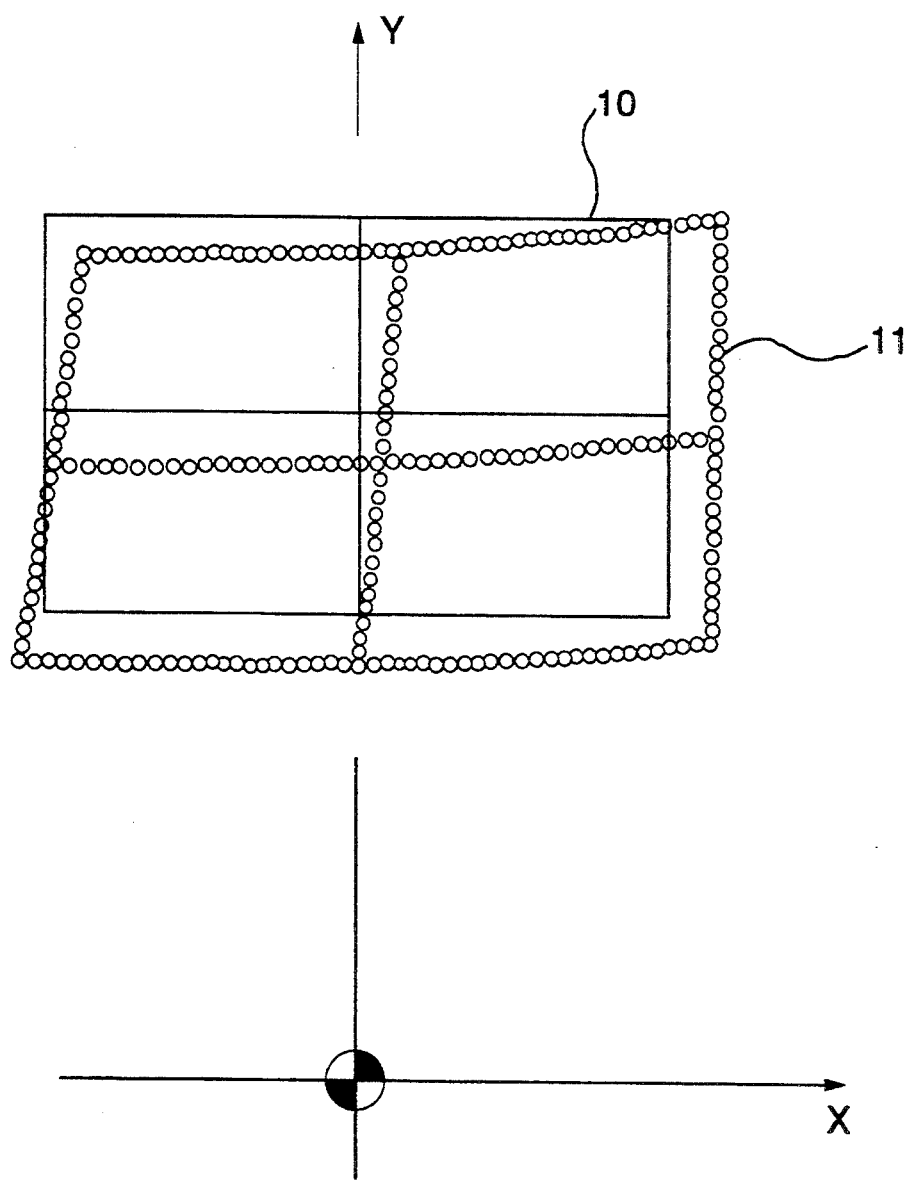
FIG. 2 is a diagram explaining the reason why positioning accuracy drops unless positioning to an origin is accurately done in the robot in FIG. 1.

In palletizing work which requires arms to move on cartesian coordinates or assembling work which is performed under instructions from visual sense, a robot itself may need to conduct coordinate transformation from an articulated system to cartesian coordinates in some cases. FIG. 2 explains the reason why the distortion described above arises. When a horizontally articulated robot in FIG. 1 is supposed to be in zero position, if the first arm (2) and the second arm (3) are not on a straight line, i.e., the arms form an angle deviation, an instructed position 10 is distorted on cartesian coordinates as represented with reference numeral 11 in FIG. 2, thus causing a great deviation of position. As a result, a problem arises in above-mentioned palletizing work or assembling work to be performed under instructions from visual sense.

Figure 3:
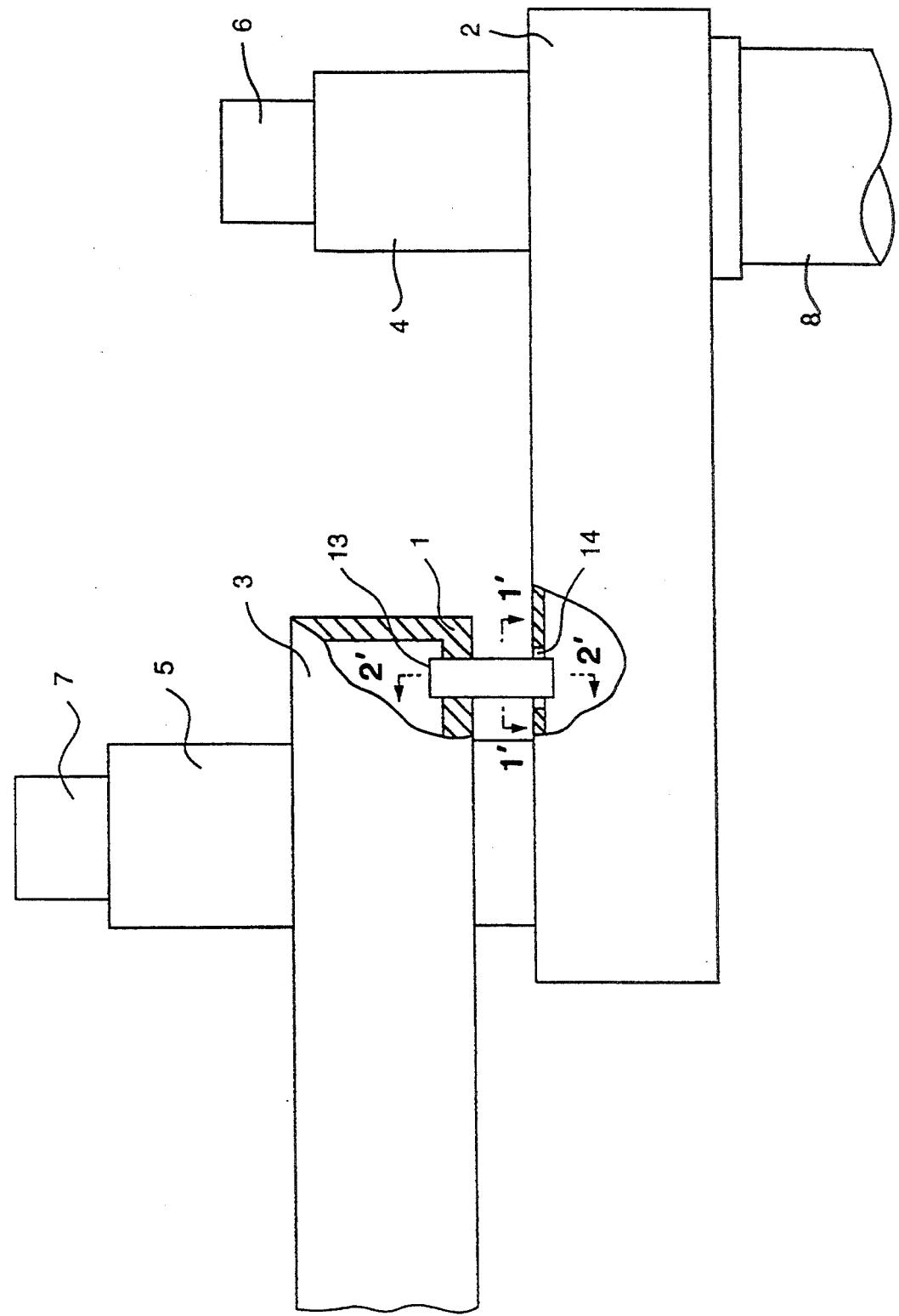
FIG. 3 is a partially sectional view of a calibrating device according to an embodiment of a calibrating method of the present invention.

FIG. 3 shows an embodiment of the present invention, i.e. an application of the present invention to a robot apparatus in FIG. 1. In FIG. 3, reference numeral 1 is a jig shaft to be used only for calibrating an angle deviation of the second arm (3). A first arm frame 2 has a hole on an arm center axis thereof which loosely engages with the shaft 1, and is rotated with a motor. A second arm frame 3 has a hole on an arm center axis thereof which closely engages with the shaft 1, and is rotated with a motor. Reference numeral 4 is a motor for driving the arm 2, and reference numeral 6 is a pulse encoder for detecting the position of the motor 4; reference numeral 5 is a motor for driving the arm 3, and reference numeral 7 is a pulse encoder for detecting the position of the motor 5.

Figure 4:
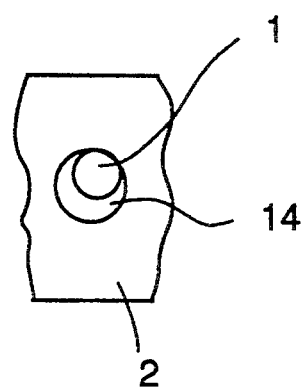
FIG. 4 is a diagram explaining the positional relationship between a jig and a hole of the device in FIG. 3.

FIG. 4 is a sectional view of section 1'—1' of FIG. 3 as viewed from above and represents the loosely engaging state of the jig shaft 1 and the hole 14 provided in the arm frame 2 on the arm center axis thereof.

Since the shaft 1 is needed primarily for calibrating operation as described above, the shaft is usually unnecessary and therefore, is disengaged when a robot performs operations thereof. In other words, the shaft 1 is fitted to the hole 13 in the arm 3 only when a calibrating operation is to be performed.

Figure 5:
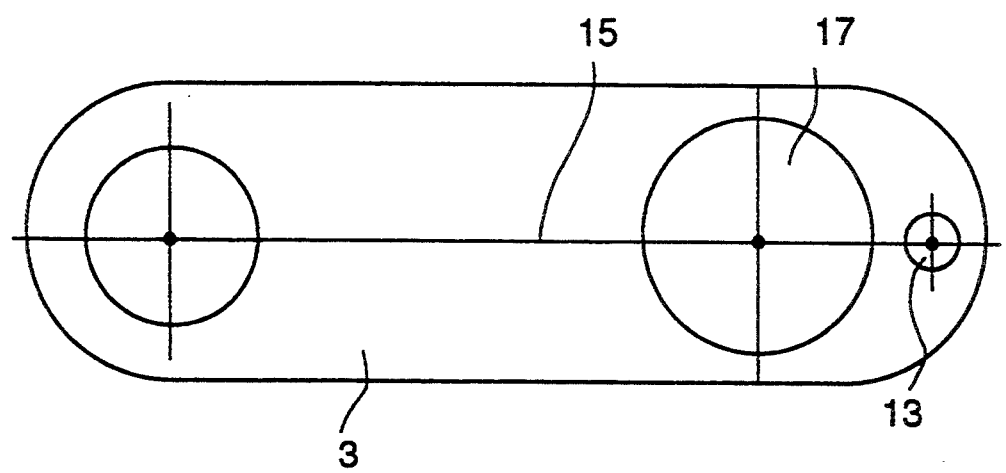
FIGS. 5 and 6 are diagrams explaining the positional relationship between the jig and hole mentioned above and the first and second arms.
Figure 6:
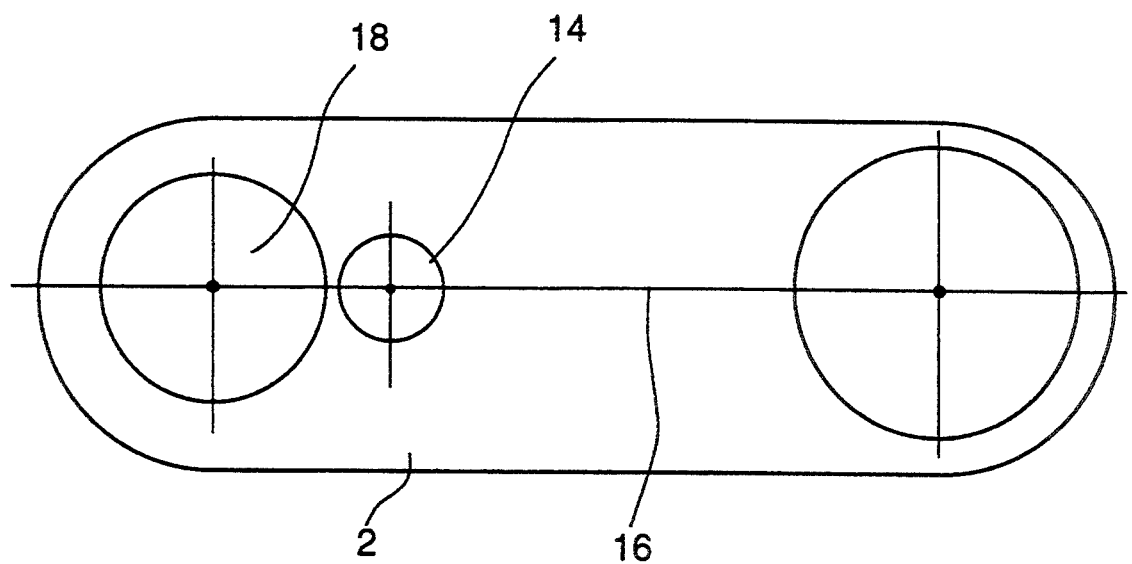

FIGS. 5 and 6 show the hole 13 for mounting therein the jig shaft 1 provided on the arm 3 and the arm 2 and the hole 14 for loosely engaging with the jig shaft 1, respectively. In FIG. 5, the mounting hole 13 is provided in the arm 3 on a straight line 15 extending in the longitudinal direction of the arm at a high accuracy. In other words, the hole 13 is machined so that the center of the mounting hole 13 falls on the straight line 15 with high accuracy. On the other hand, a distance from an axis of rotation 13 to the hole 17 may be at a low accuracy. In FIG. 6, the loosely engaging hole 14 is also machined in the arm 2 on a straight line 16 with high accuracy; however, a distance thereof from an axis of rotation 18 of the arm 2 and the diameter thereof are machined at a low accuracy.

The outline of a calibrating method according to the present embodiment will hereinafter be described with reference to FIG. 7 through FIG. 13.

Figure 7:
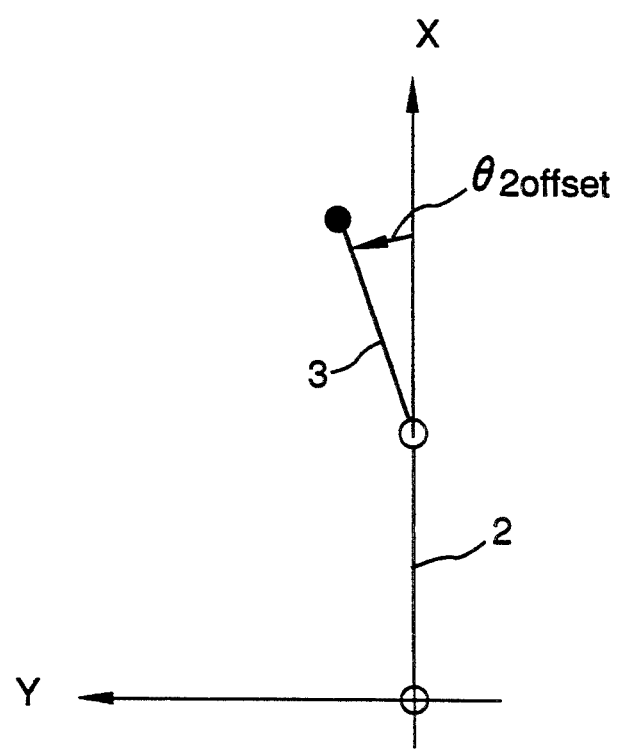
FIGS. 7, 8 and 9 are diagrams explaining the movement of each arm in an execution process of an origin calibrating method of the embodiment.

First, as preparation work for calibrating an angle deviation of the arm 3, a zero return is performed on the motor of the horizontally articulated robot for clearing a detected value of the pulse encoder 7 to zero. This position is a "temporary origin." FIG. 7 shows a state at the time of the zero return. As shown in FIG. 7, when two arms are in the temporary origin position, both arms are offset with each other. Also, in FIG. 7, the difference between an angle of the arm 3 and a theoretical zero position (the arm 2 and the arm 3 are on a straight line) is a desired angle deviation of the arm 3, $\theta_{2offset}$.

The sequence of the calibrating method of the present embodiment will be described.

In order to obtain an offset angle described above, this calibrating method requires an operator to manually move the arm 3, and therefore, the servo of the arm 3 is released. Hence, only power to the motor 5 for driving the arm 3 to be calibrated is turned off, and detection by the pulse encoder 7 is left continuing. However, a motor control for the arm 2 is left continuing (a servo lock state is maintained) for leaving the arm 2 fixed. Next, as shown in FIG. 3, the jig shaft 1 is so mounted that shaft 1 loosely engages with the arm 2 and fits into the arm 3.

Figure 10:
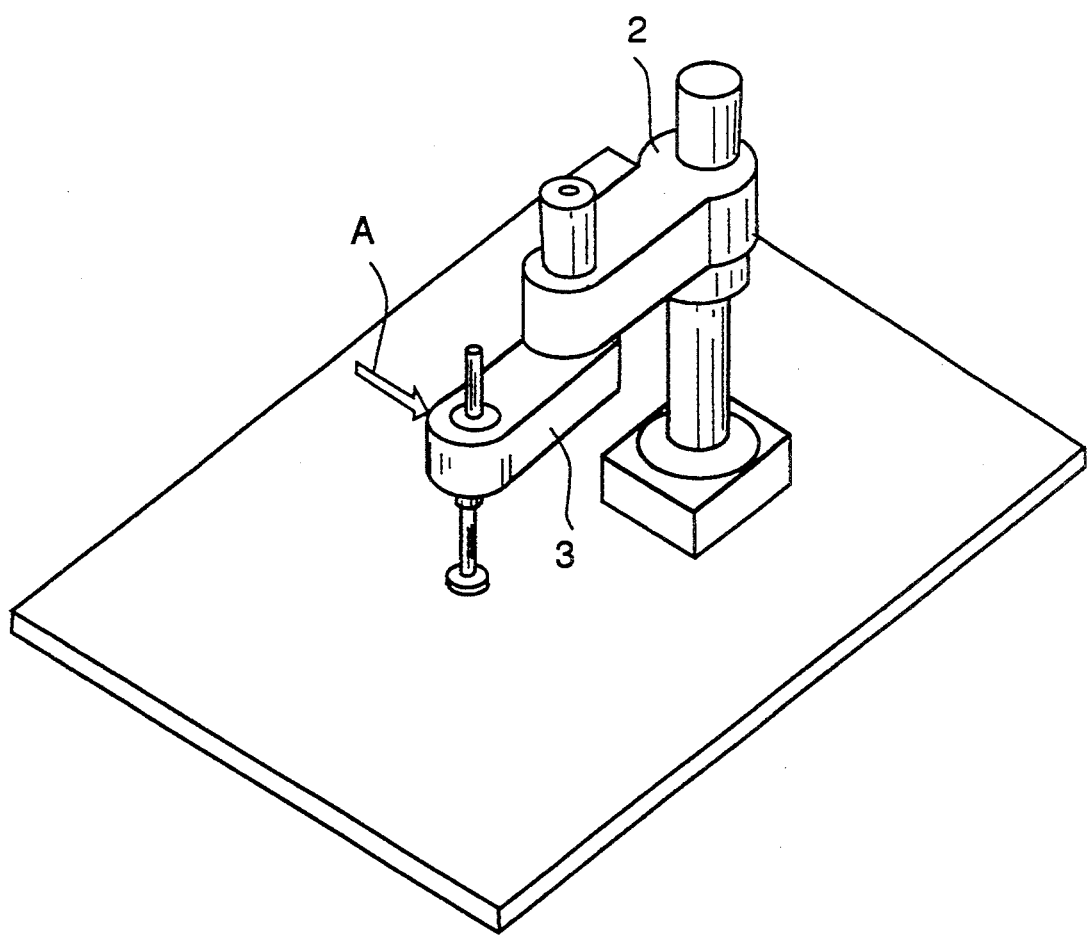
FIGS. 10 and 11 are diagrams explaining the movement of the second arm in an execution process of an origin calibrating method of the embodiment.

As a calibrating work, as shown in FIG. 10, the tip of the arm 3 is pressed with a predetermined force (a force greater than a rotational sliding resistance force of the arm 3) in the direction of A in FIG. 10 by using a push-pull gauge or the like.

Figure 8:
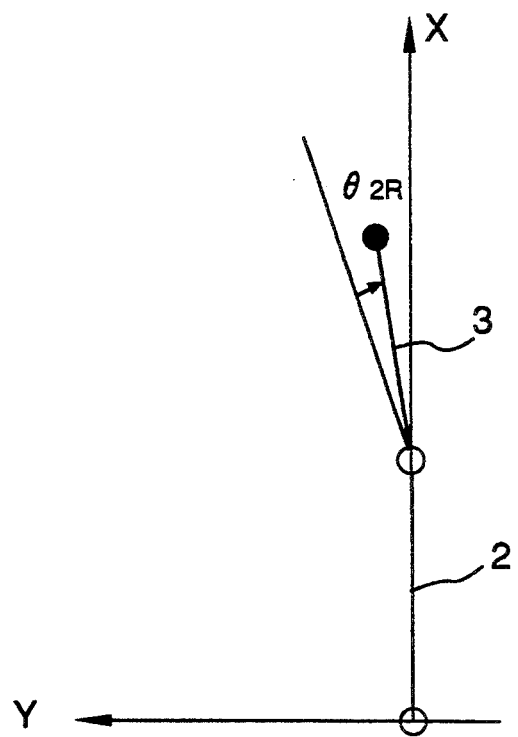
Figure 12:
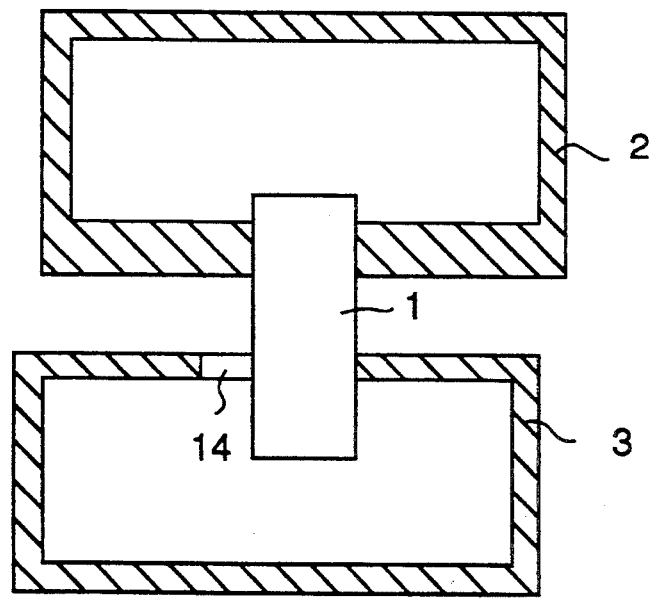
FIGS. 12 and 13 are diagrams explaining a change in the positional relationship between the jig and the hole in an execution process of an origin calibrating method of the embodiment.
Figure 13:
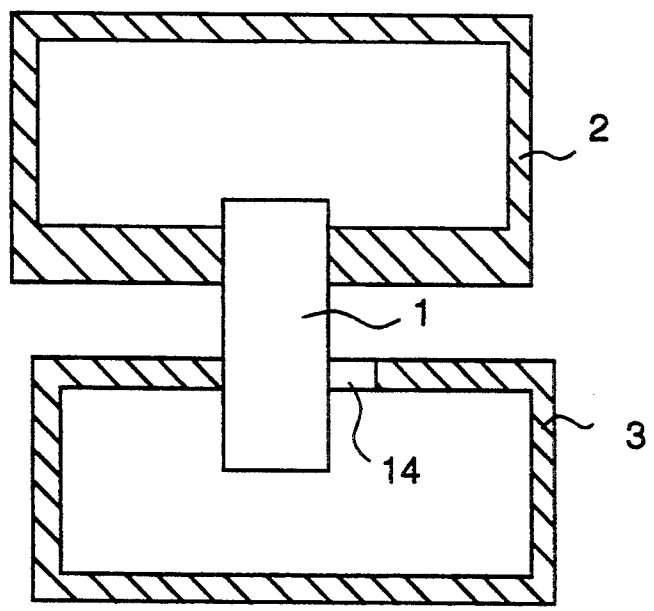

FIGS. 12 and 13 shows a 2'—2' section in FIG. 3. FIG. 12 shows the positional relationship between the jig shaft 1 and the calibrating hole 14 when a force is applied to the arm 3 in the direction of A (FIG. 10). The arm 3 in a state in FIG. 10 postures as shown in FIG. 8. Hence, an angle of the arm 3 with the temporary origin is measured as a detected value of $\theta_{2R}$ of the pulse encoder 7.

Figure 9:
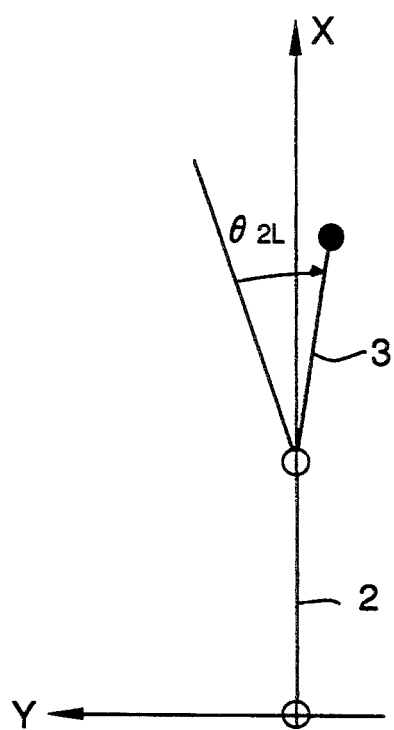
Figure 11:
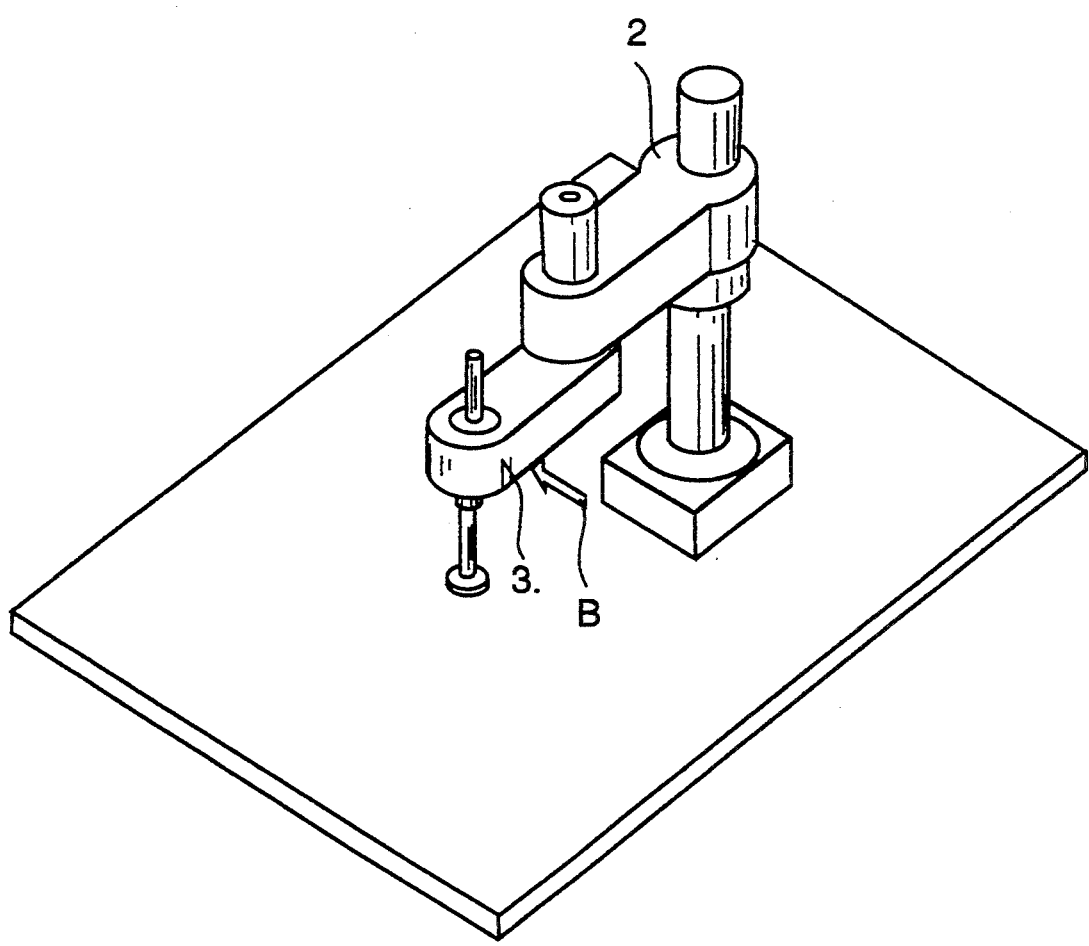

Likewise, as shown in FIG. 11, the tip of the arm 3 is pressed with a predetermined force in the direction of B being different from a direction in the preceding measurement by using a push-pull gauge or the like. FIG. 13 shows the positional relationship between the jig shaft 1 and the calibrating hole 14 at the time of pressing the tip of the arm 3. FIG. 9 shows the posture of the arm 3 in the state of the positional relationship, and an angle of the arm 3 with the temporary origin is measured as a detected value of $\theta_{2L}$ of the pulse encoder.

An angle deviation of the arm 3, $\theta_{2offset}$, is obtained from the above-mentioned measured values, $\theta_{2R}$ and $\theta_{2L}$, as:

$$\theta_{2offset}=(\theta_{2L}-\theta_{2R})/2$$

Figure 14:
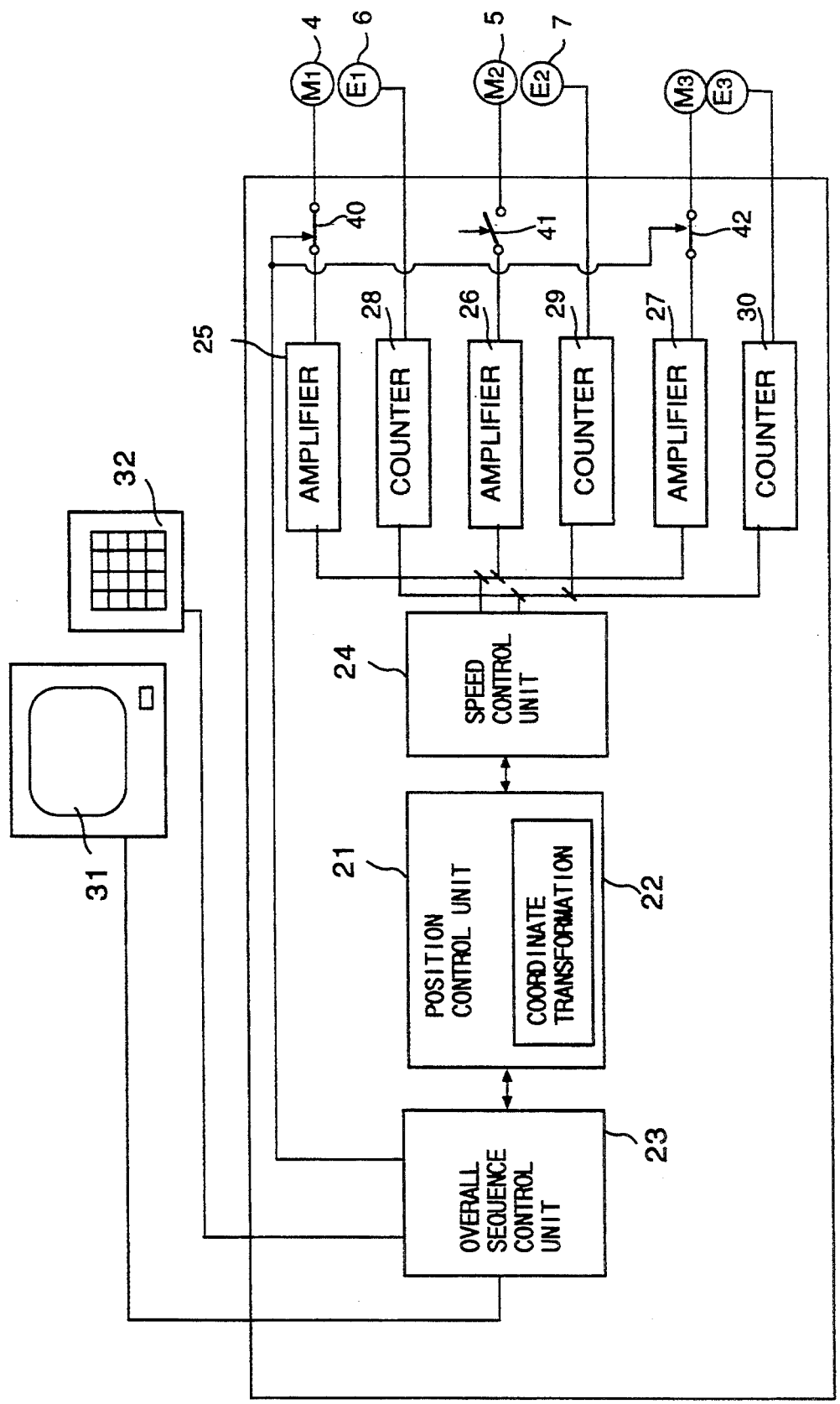
FIG. 14 is a diagram explaining calibration by control units of the device according to the embodiment.

FIG. 14 is a block diagram of a control device for the horizontally articulated robot in FIG. 1.

Reference numerals 31 and 32 are a CRT and a keyboard, respectively, for use as data input means to be operated by an operator. The control device includes an overall sequence control unit 23 for a robot, a robot position control unit 21 including a coordinate transformation unit 22 for performing transformation from an angle of articulation to cartesian coordinates and reverse coordinate transformation thereof, and a speed control unit 24 for speed control over each arm. The position control unit 21 gives a speed instruction value of each axis to the speed control unit 24 on the basis of a robot moving instruction value from the overall sequence control unit 23. Reference numerals 25, 26 and 27 are amplifiers for rotatively driving a motor of each axis, and controls the motors on the basis of an instruction (torque) from the speed control unit 24. Reference numerals 28, 29 and 30 are position counters for storing a pulse encoder value of each axis, and are referenced by the host control units 24 and 22.

In FIG. 1, the arm 2 is called the first axis, the arm 3 is called the second axis, and the hand shaft 11 is called the third axis. The SW41 is a switch for releasing a servo for the arm 3 (second axis). In other words, opening the SW41 enables operations as shown in FIGS. 10 and 11. The sequence control unit 23 contains, in advance, a program describing a calibration control procedure. When an operator performs an operation from the keyboard 32 for starting the calibration program, the control unit 23 enters a calibrating operation mode for opening the switch 41, and displays the release of the servo for the arm 3 on the CRT31, thereby prompting the operator to perform operations in FIGS. 10 and 11. Each time the operator moves the arm 3 to a position shown in FIG. 12 or FIG. 13, the operator presses a predetermined key (on the keyboard 32). When the above-mentioned key is pressed with the arm 3 being put in a state in FIG. 12, the sequence control unit 23 takes as $\theta_{2R}$ a value which the position control unit has read from the encoder 7; when a key is pressed with the arm 3 being put in a state in FIG. 13, an encoder output is taken as $\theta_{2L}$. Then, the calibration program causes a calculated angle deviation, $\theta_{2offset}$, to be stored in the coordinate transformation unit 22 within the position control unit 21.

Now, the calibrating operation has been completed; after the operator removes the shaft 1, a robot in FIG. 1 uses $\theta_{2offset}$ for coordinate transformation. Thus, a horizontally articulated robot can be moved and positioned accurately in a cartesian coordinates system.

Other Embodiments

The present invention can be modified variously without deviation from the gist of the invention. For example:

(1) According to said embodiment, the arm 3 is provided with a jig shaft, and the arm 2 is provided with a loosely engaging hole. However, the same effect is obtained even when the arm 2 is provided with a jig shaft, and the arm 3 is provided with a loosely engaging hole.

(2) Also, according to said embodiment, the mounting hole 13 for the jig shaft 1 in FIG. 5, and the loosely engaging hole 14 in FIG. 6 are machined at a high accuracy so as to ensure an accuracy of alignment thereof with a straight line. However, even when measurement is made after the holes have been machined at a low accuracy, the same effect is obtained.

(3) According to said embodiment, the present invention is applied to a robot with three degrees of freedom in FIG. 1; however, the present invention is also applicable to horizontally articulated robots with four or more degrees of freedom.

Figure 15:
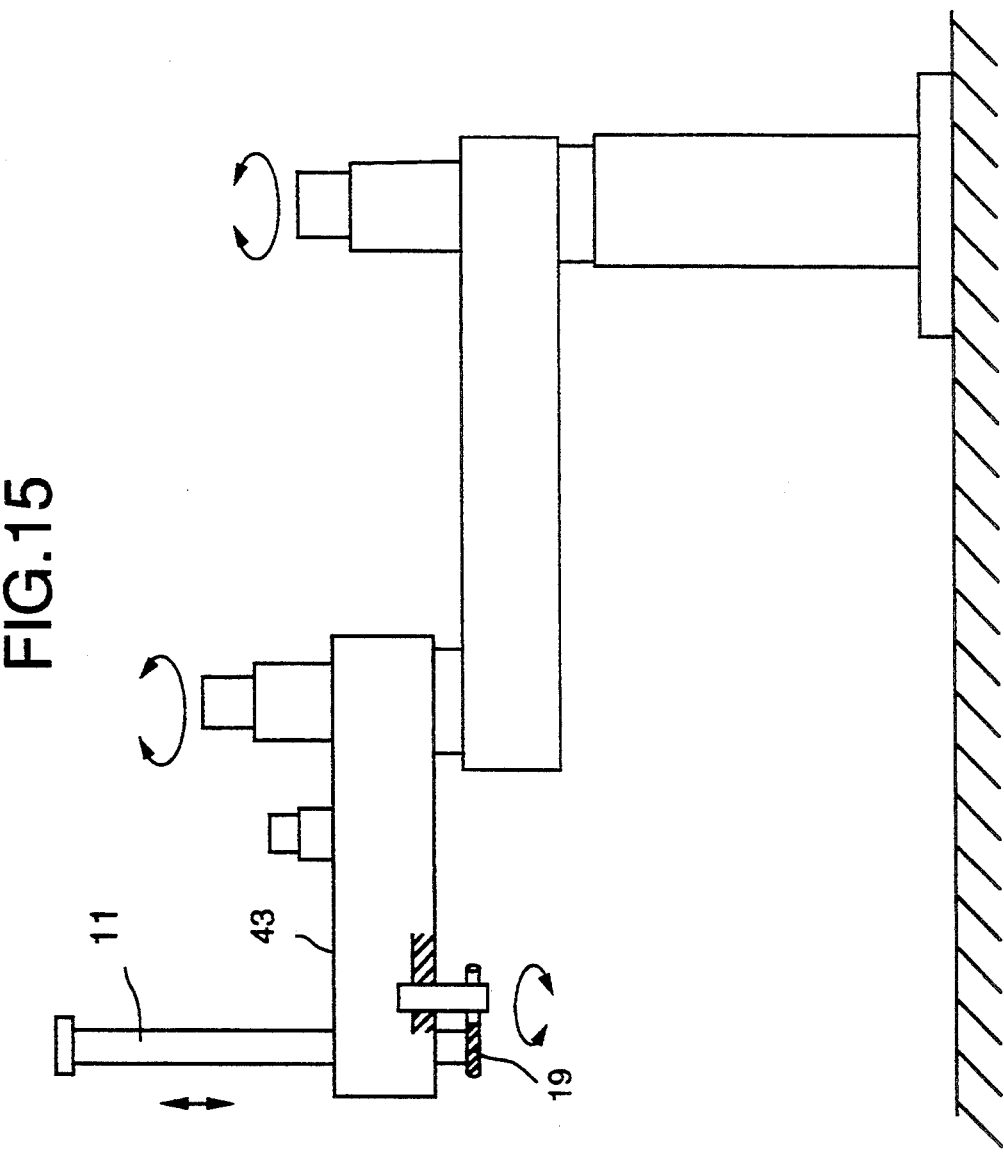
FIGS. 15 and 16 are diagrams explaining the structure of other embodiments of the present invention.

FIG. 15 is an example of applying the present invention to the second arm (43) and the axis-of-rotation base 19 of the end shaft 11 of a horizontally articulated robot with four degrees of freedom. This modified example can be easily understood by reading the first arm 2 of an embodiment in FIG. 3 as the arm 43 in FIG. 15, and the second arm (3) in FIG. 3 as the end axis-of-rotation base 19 in FIG. 4.

Figure 16:
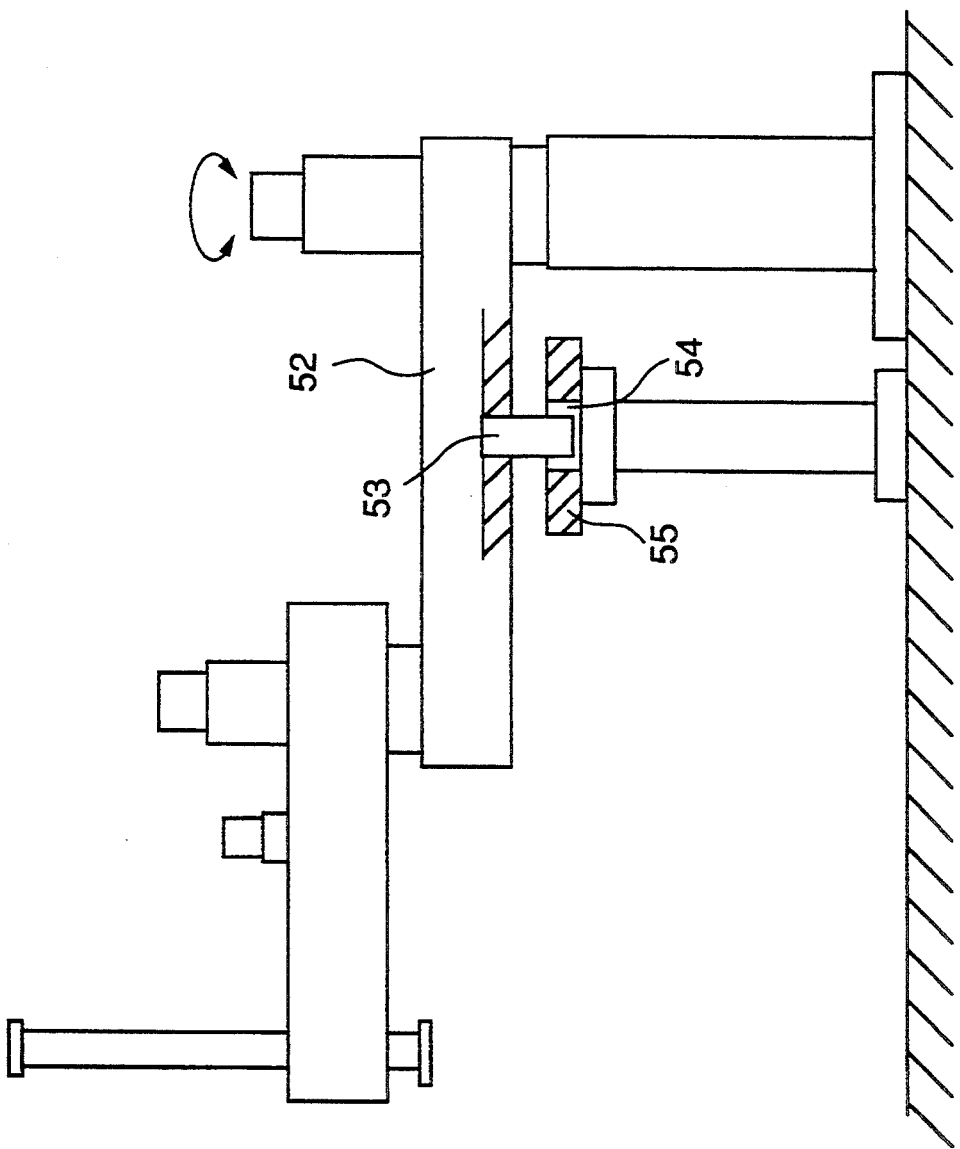

(4) FIG. 16 is an example of detecting the angle deviation between a predetermined straight line on the first arm (52) in the longitudinal direction thereof and a predetermined straight line on a robot base bed for a horizontally articulated robot. In FIG. 16, a jig shaft 53 is mounted on the arm 52 in a predetermined position, and the base bed is provided with a jig 55 being provided with a hole 54 for loosely engaging with the above-mentioned shaft 53.

(5) According to the embodiment described above, an operator moves the second arm manually as shown in FIGS. 10 and 11; however, this moving operation may be automated. In the case of the automation, however, a servo for the second arm to be calibrated needs to be maintained, and also, a detecting means is needed for detecting that the shaft 1 has come in contact with the loosely engaging hole 14 by moving the second arm. Such detecting means can be easily implemented by detecting a load being imposed on a servo motor.

As described above, according to the present invention, an origin detection can be easily and highly accurately made at a small error in calculating an angle deviation without requiring high-accuracy machining (or measurement), and finally, provided are articulated robots capable of being moved and positioned accurately in a cartesian coordinates system.

What is claimed is:

1. An arm origin calibrating method for an articulated robot having a plurality of arms, the articulated robot includes first and second arms connected freely rotatable with each other, the first arm being pivoted at one end thereof in a position closer to a mounting axis of a robot base, the second arm being pivoted freely rotatable at another end of the first arm, said method comprising the steps of:

engaging loosely a slender jig provided in the first arm and extending in the direction of an axis of rotation of the first arm and into a hole provided in the second arm, with an inner surface of the hole extending in the direction of the axis of rotation of the second arm, after performing a rough zero return on the first arm;

detecting in a first step a first rotation angle of the first arm in a state that the second arm is fixed in position and the first arm is rotated in a first rotating direction to bring the jig into contact with the inner surface of the hole;

detecting in a second step a second rotation angle of the first arm in a state that the second arm is fixed in position and the first arm is rotated in a second rotating direction opposite to the first rotating direction to bring the jig into contact with the inner surface of the hole;

calculating an offset angle of the first arm with respect to the second arm on the basis of detecting the first and second rotation angles;

calibrating the arms based on the calculated offset angle to control operation of the articulated robot;

positioning a round bar as the jig and positioning the round bar on a line connecting two centers of rotation of the first arm, the hole being a round hole and positioned on a line connecting two centers of rotation of the second arm; and measuring the geometric centers of the round bar and the round hole to confirm their position on a straight line of the first and second arms.

2. A method according to claim 1, further comprising the step of horizontally articulating the articulated robot.

3. A method according to claim 1, wherein each of said first and second detecting steps includes a step of releasing a servo for the first arm and a step of manually rotating the first arm.

4. A method according to claim 1, further comprising the step of forming a mounting hole for the round bar and forming the round hole in the first and second robot arms, respectively, with high accuracy on a predetermined straight line.

5. A method according to claim 1, further comprising the step of including a rotating arm portion on the first arm and using a robot base as a fixed portion.

* * * * *

UNITED STATES PATENT AND TRADEMARK OFFICE
CERTIFICATE OF CORRECTION

PATENT NO. : 5,418,890
DATED : May 23, 1995
INVENTOR(S) : Ishihara et al.

It is certified that error appears in the above-indentified patent and that said Letters Patent is hereby corrected as shown below:

COLUMN 1:

Line 50, "25," should be deleted.

Signed and Sealed this

Seventeenth Day of October, 1995

*Attest:*

BRUCE LEHMAN

*Attesting Officer*    *Commissioner of Patents and Trademarks*